United States Patent [19]
St. John Danko

[11] Patent Number: 5,829,602
[45] Date of Patent: Nov. 3, 1998

[54] RIPENING DEVICE FOR FRUITS AND VEGETABLES

[76] Inventor: Patricia St. John Danko, 2112 Dunlavy, Houston, Tex. 77006

[21] Appl. No.: 749,738

[22] Filed: Nov. 15, 1996

[51] Int. Cl.⁶ ..................................................... A47F 7/00
[52] U.S. Cl. ......................... 211/13.1; 211/85.4; 211/189
[58] Field of Search .................................. 211/13.1, 85.4, 211/189; 108/56.1, 51.3

[56] References Cited

U.S. PATENT DOCUMENTS

| | | | |
|---|---|---|---|
| 1,717,233 | 6/1929 | Lefiell | 211/85.4 |
| 2,205,064 | 6/1940 | Irwin | 211/85.4 X |
| 4,779,524 | 10/1988 | Wade . | |
| 5,028,443 | 7/1991 | Wade . | |
| 5,121,877 | 6/1992 | Bodary et al. . | |
| 5,165,947 | 11/1992 | Colucci et al. . | |
| 5,195,424 | 3/1993 | Guajaca | 211/85.4 X |
| 5,279,431 | 1/1994 | Highsmith et al. | 211/189 |
| 5,373,780 | 12/1994 | Bianco . | |
| 5,425,314 | 6/1995 | MacFarland | 108/56.1 X |
| 5,628,415 | 5/1997 | Mulholland | 211/189 |

FOREIGN PATENT DOCUMENTS

| | | | |
|---|---|---|---|
| 89410 | 9/1983 | European Pat. Off. | 108/181 |
| 579964 | 11/1977 | U.S.S.R. | 211/189 |

*Primary Examiner*—Jose V. Chen

[57] ABSTRACT

An apparatus for obtaining uniform ripening of fresh produce using sunlight and air in the shape of a stand has a number of slats that are supported by the sides of the stand. The position and spacing of the slats can be adjusted to accommodate produce of different shapes and sizes. The stand is constructed so that multiple units may be stacked atop one another. One embodiment particularly suitable for use on window sills is rectangular in shape with openings on the sides to permit free circulation of air. A second embodiment uses the same principle but the slats are in the annulus between two hollow circular cylinders with vertical walls. This too is constructed so that multiple units may be stacked atop one another. This embodiment takes up more space, but because of its decorative aspects, can be used on tables.

9 Claims, 2 Drawing Sheets

RIPENING DEVICE FOR FRUITS AND VEGETABLES

BACKGROUND OF THE INVENTION

This invention relates to a method and apparatus for obtaining uniform ripening of fresh produce. More particularly, the invention relates to the use of natural ripening methods that involve free air circulation and the use of light, natural or artificial, to facilitate the ripening process.

There is considerable demand among consumers for ripe fresh produce. Supplying fresh ripe produce to consumers by growers and industry has been difficult due to many factors. For example, tomatoes have a limited time length of the red-ripe stage. Tomatoes are also susceptible to bruising, rupturing and microbial attack. Bruising and physical damage accelerates respiration and water loss, thus shortening the length of the red-ripe stage and causing shriveling, of the tomatoes. Most tomatoes available in the market are harvested in the mature green state of ripening and subsequently exposed to ethylene gas to initiate ripening off line. Bananas are typically transported from growing fields to special processing facilities where they are placed in specially designed ripening rooms. These ripening rooms are provided with insulated gas tight walls and roof panels and include air handling units to control the circulation and temperature of the air within the ripening, rooms. Ethylene gas may be dispersed into the room at preselected times to facilitate a uniform ripening of the produce.

The invention of Bianco (U.S. Pat. No. 5,373,780) teaches an apparatus for controlling the ripening of produce. The apparatus includes a chamber in which palletized produce is placed. A fluid control mechanism is provided to exhaust fluid from the space between the pallets and to introduce a controlled fluid into the space and forcing the fluid to flow generally uniformly throughout the pelletized produce. Wade (U.S. Pat. Nos. 4,779,524 and 5,028,443) teaches wrapping a synthetic resin strip around the faces of a stack of boxed produce and circulating ethylene through the apparatus. Bodary and Moorman (U.S. Pat. No. 5,121,877) disclose a stackable container for ripening of fruit during shipment and storage. The container is adapted to be stacked in a pallet load with other containers and they teach a method for ripening produce by circulation of ventilating air or gas. Colucci, Gundlach, Remenar and Weeks (U.S. Pat. No. 5,165,947) teach a controlled atmosphere, controlled humidity package suitable for delivery of red-ripe tomatoes to the consumer.

Even with the availability of large commercial facilities, produce at the retail stage is usually not completely ripe, i.e., the point at which consumers enjoy the full flavor of the produce. The main reason for this is that grocery stores and supermarkets may sometimes have produce on the shelf for several days; this is far too long for them to maintain their full flavor. Several consumers may handle a tomato on the shelf, for example, before one of them takes it home. Who has not seen the inconsiderate shopper who squeezes and pinches several tomatoes or peaches before finally making a selection?

A method by which a consumer could take produce home and ripen it there would have considerable attraction. The consumer could have control over the ripening process. Such an invention would also be very useful for the innumerable people who grow their own produce and would like to ripen them off the plants. This is desirable, for example, to reduce their exposure to pests, heat, excessive rainfall or lack of rain.

Such an invention would have to deal with many constraints not faced by commercial growers and shippers. The first constraint is lack of space: storage space is at a premium in most homes. The second problem is non-uniform size of the produce being ripened: commercial shippers are dealing with a single product of predictable and uniform size whereas the typical consumer has to deal with tomatoes, peaches, squash and potatoes—varying sizes and shapes. Finally, the consumer usually does not have access to or want to deal with ethylene, cooling and air circulation equipment An object of the present invention is to provide an improved method and apparatus for controlling the ripening of produce in a limited amount of space.

Another object of the present invention is to provide unitized construction such that the user can conveniently add more units without using any additional floor space.

Another, more particular, object of the present invention is to provide such a method and apparatus that can handle produce of a variety of shapes and sizes of produce.

A further object of the present invention is to provide such a method and apparatus in which no special means for air circulation or air conditioning are used.

Yet another object of the invention is to be able to use light instead of ethylene gas to facilitate the ripening process.

SUMMARY OF THE INVENTION

Two embodiments of the invention are disclosed. The first embodiment discloses a stand for the ripening of produce that is particularly suitable for use on window sills. The stand is rectangular and the sides are provided with openings on the sides that permit free circulation of air. The top of the stand is designed with a number of slats that are supported by the sides of the stand. The position and spacing of the slats can be adjusted to accommodate produce of different shapes and sizes. The stand is also constructed so that multiple units may be stacked atop one another.

The second embodiment uses the same principle but the slats are in the annulus between two panels of circular cross section, with vertical walls. This too is constructed so that multiple units may be stacked atop one another. This embodiment takes up more space, but because of its decorative aspects, can be used on tables.

DETAILED DESCRIPTION OF THE INVENTION

First Embodiment

Figure 1:
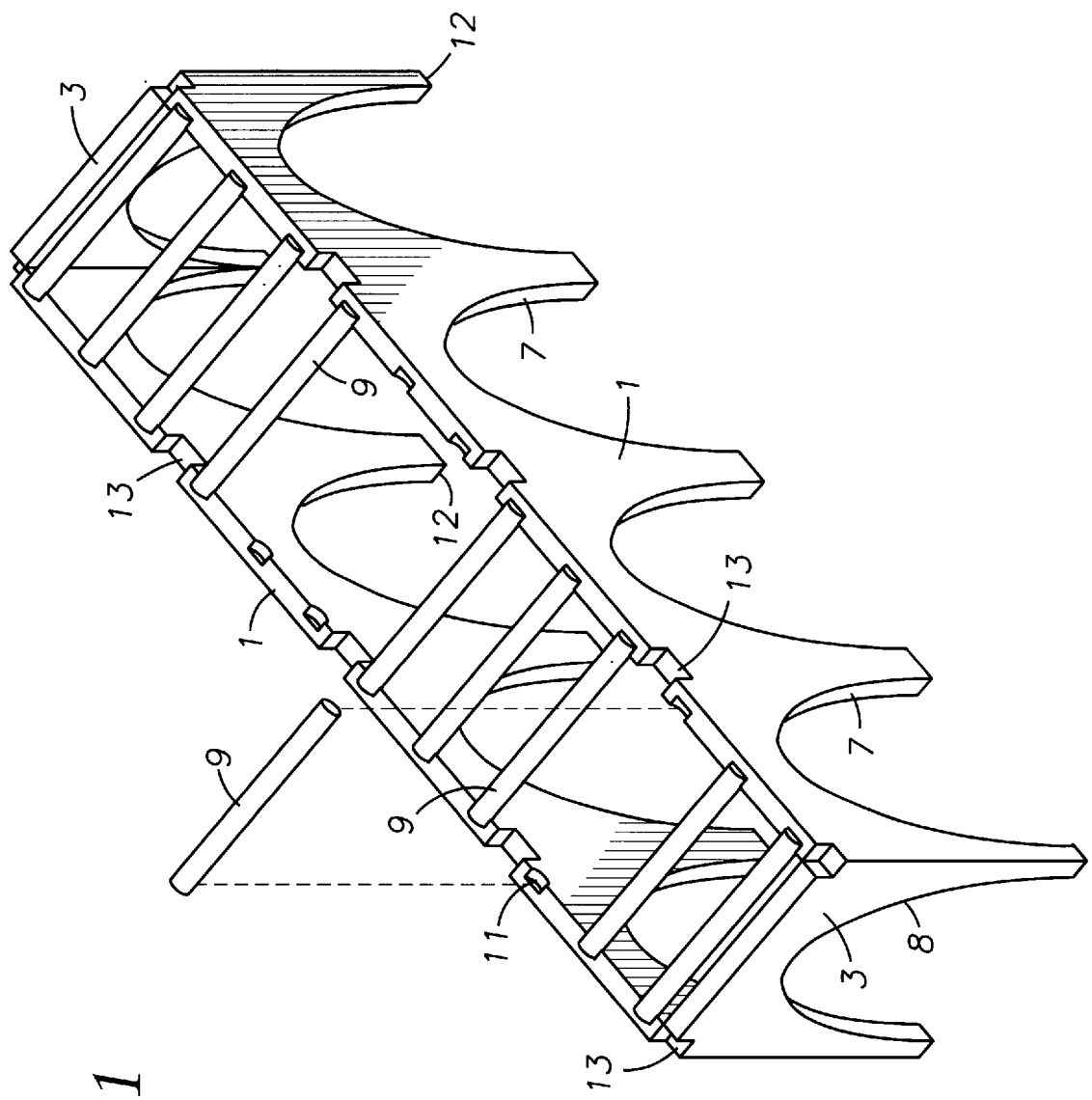
FIG. 1 is an isometric view of the first embodiment of the invention.

The first embodiment of the invention can be best understood with reference to FIG. 1. It consists of two vertical side members, 1, and two vertical end members, 3. The reference to "end" and "side" members is for convenience only, because the lengths of the two members is arbitrary.

The side members and the end members have a multiplicity of openings, 7 and 8, in them designed to allow free flow of air across the members 1 and 3. The tops of the side members, 1, have a multiplicity of notches, 11, in them. These notches, 11, are designed to accommodate the slats, 9.

These slats could be of rectangular or circular cross section and are designed to be freely interchangeable so that the spacing between the slats in the normal operation of the invention can be varied. The slats serve as the means to support and hold, in an upright orientation, fruit and vegetables of different shapes and sizes. This is different from prior art devices that are used for ripening of a single variety of fruit or vegetable of uniform size.

With this arrangement of slats, it is possible to arrange vegetables and fruit in a manner that allows them to be separated from on another so as to promote light and air circulation around them individually, to allow them to be periodically reoriented, if so desired and to maintain them securely in the location in which they are placed. As would be familiar to those knowledgeable in the art, adequate circulation of air and exposure to sunlight is beneficial in the ripening process. This invention differs from prior art devices that typically use ethylene to facilitate the ripening process. Furthermore, no special means for air conditioning or air circulation are needed.

Placement of the stand is frequently and ideally in a location where the produce kept on them can receive maximum sunlight (though artificial light of suitable wavelength will often suffice). Such a placement is often on a window sill or on the upper edge of the lower section of a casement window. A rectangular shape of the first embodiment, wherein the side members are much longer than the end members is preferable. For very narrow locations, an accessory bracket may be provided for additional stability. Use of such an accessory bracket would be familiar to those knowledgeable in the art.

The first embodiment is also constructed so that single stands, of the type described above, may be stacked on top of one another. This is accomplished by having grooves, 13, on the top of the side members and the end members, that are designed to accommodate the feet, 12, of the side members that are aligned vertically with the grooves. This can be seen in FIG. 1. This ability to stack the individual stands makes efficient use of space.

The construction of the device herein is not dependent upon any specific material and may be such that in certain versions, a combination of materials may be used. Those familiar with the art will also recognize that, with the exception of the slats, the entire embodiment could be made in one piece. Alternatively, the side members and the end members could be made separately and assembled by means well known in the art.

Figure 2:
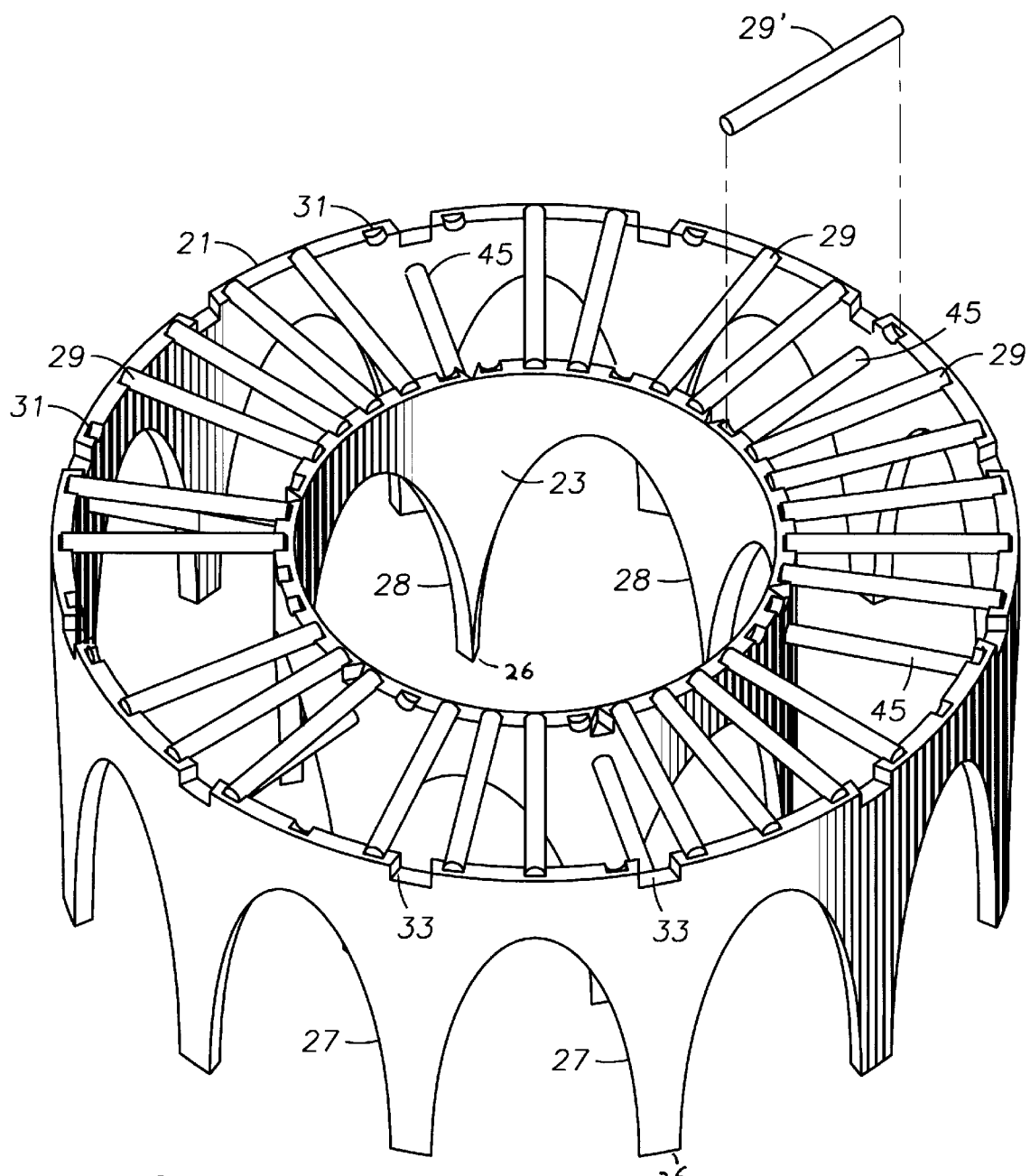
FIG. 2 is an isometric view of the second embodiment of the invention.

The device may have certain decorative design and color treatments intended to an esthetically pleasing appearance to the device. For illustrative purposes only, these design elements could be representations of fruits and vegetables Second EmbodimentThe second embodiment of the invention can be best understood with reference to FIG. 2. It consists of an outer member of circular cross section and vertical faces, 21 and an inner member of circular cross section and vertical faces 23.

The inner member, 23, has openings, 28, between the legs, 26, to allow free flow of air across the member. The outer member, 21, has openings, 27, between the legs, 26, to allow free flow of air across the member. The tops of the inner and outer members, 23 and 21, have a multiplicity of notches, 31, in them. These notches, 31, are designed to accommodate the slats, 29. These slats could be of rectangular or circular cross section and are designed to be freely interchangeable so that the spacing between the slats in the normal operation of the invention can be varied. The slats serve as the means to support and hold, in an upright orientation, fruit and vegetables of different shapes and sizes.

With this arrangement of slats, it is possible to arrange vegetables and fruit in a manner that allows them to be separated from on another so as to promote light and air circulation around them individually, to allow them to be periodically reoriented, if so desired and to maintain them securely in the location in which they are placed. As would be familiar to those knowledgeable in the art, adequate circulation of air and exposure to sunlight is beneficial in the ripening process.

The second embodiment is also constructed so that single stands, of the type described above, may be stacked on top of one another. This is accomplished by having grooves, 33, on the top of the cylindrical members, that are vertically aligned above the legs, 26, of the cylindrical members and designed to accomodate the legs. For the sake of simplifying the illustration, these notches are only indicated on the outer member.

The stand is also provided with a number of braces 45 to keep the inner cylindrical member 23 centered within the outer cylindrical member 21, so that the axes of the two cylindrical members coincide. The use of these braces and means for coupling these to the inner and outer members would be familiar to those knowledgeable in the art.

The construction of the device herein is not dependent upon any specific material and may be such that in certain versions, a combination of materials may be used. The device may have certain decorative design and color treatments intended to an esthetically pleasing appearance to the device. For illustrative purposes only, these design elements could be representations of fruits and vegetables.

What is claimed is:

1. A stand for ripening of produce comprising:
   (a) a hollow member having a rectangular cross section, four side walls having a thickness, a first end and a second end, two opposing side walls of the hollow member having a plurality of openings and a plurality of notches on the respective first ends, said notches having a length measured across said thickness which is less than said thickness; and
   (b) a plurality of slats freely reposing on the first end of the hollow member within said notches confined between said two opposing sides thereof.

2. The stand of claim 1 wherein the notches are equally spaced.

3. The stand of claim 2 wherein the second end of the two opposing side walls have feet and the first end of the two opposing side walls have grooves adapted to receive the feet.

4. The stand of claim 1 wherein said plurality of slats is less than the plurality of notches on the ends of the hollow member.

5. The stand of claim 1 wherein the hollow member is integrally constructed.

6. The stand for ripening produce of claim 1 wherein the four side walls are integrally constructed.

7. A stand for ripening produce comprising:
   (a) an inner and an outer hollow circular cylinder, each cylinder having a first end and a second end and a thickness, the sides of the cylinders having a plurality of openings, each hollow cylinder further having a plurality of notches on its first end said notches having a length less than said thickness;
   (b) a plurality of detachable slats reposing on the notches on the first end of the inner hollow circular cylinder and the first end of the outer hollow circular cylinder, said slats confined between the inner and outer cylinders ; and (c) a plurality of braces coupled to the sides of the inner cylinder and the outer cylinder for maintaining the cylinders in a spaced apart position.

8. The stand of claim 7 wherein the second end of the inner cylinder has projections and the first end of the inner cylinder has notches adapted to receive the projections; and the second end of the outer cylinder has projections and the first end of the outer cylinder has grooves adapted to receive the projections.

9. The stand of claim 7 wherein said plurality of slats is less than the plurality of notches on the ends of the cylinders.

* * * * *